United States Patent Office 3,840,657
Patented Oct. 8, 1974

3,840,657
MAKING GAS-FREE DENTIFRICES
James Norfleet, Plainfield, N.J., assignor to Colgate-Palmolive Company, New York, N.Y.
No Drawing. Continuation-in-part of abandoned application Ser. No. 185,860, Oct. 1, 1971. This application June 14, 1972, Ser. No. 262,608
Int. Cl. A61k 7/16
U.S. Cl. 424—49
22 Claims

ABSTRACT OF THE DISCLOSURE

Gas-free paste or gel dentifrices are made by a process which includes producing a solution or slurry of a gelling agent, e.g., a glycerol-sorbitol slurry of sodium carboxymethyl cellulose, with a polishing agent, e.g., dicalcium phosphate, sodium alumino-silicate or silica xerogel, dispersed therein, degassing the mixture under vacuum, admixing with it a mixture (solution or slurry) of synthetic organic detergent, e.g., sodium lauryl sulfate and/or sodium N-lauroyl sarcoside in a liquid medium, e.g., water, glycerol and/or sorbitol, previously degassed at an elevated temperature, and vacuum degassing the product made.

---

This is a continuation-in-part of my U.S. patent application S.N. 185,860, filed Oct. 1, 1971, now abandoned.

Dentifrices, such as tooth pastes or dental creams, are usually extrudable gelled products containing insoluble polishing agents which aid in the removal of plaque, stains and other deposits from the teeth and help to polish and whiten them. They sometimes contain noticeable air bubbles. Even when air bubbles are not readily visible to the eye, a microscope slide test, in which a small quantity of dental cream is placed between two glass microscope slides, which are then pressed together, often shows some gas to be present in products which are otherwise of satisfactory appearances. Such bubbles are not especially objectionable in the normal opaque tooth pastes because they are essentially invisible to the human eye. Of course, if transparent dentifrices are to be made free of gas bubble content, degassing may have to be more complete than for opaque dentifrices because the bubbles or a clouding effect caused by them may be visible throughout the thickness of the transparent dentifrice gel. Even in opaque dentifrices it is often desirable to avoid having air entrapped in the product because gas-free dentifrices are more uniform and more dense.

Many techniques are well known for removing gases from various viscous products. Application of vacuum has been standard in commercial dentifrice production for many years. Uses of solvents to diminish viscosities of products so as to make the gas bubbles more readily removable is known. Various solvents have been described for removing gas bubbles from dentifrices and physically similar products. To promote coalescence of gases and make them more readily removable, volatile solvents, flavors and other materials have been included in dental preparations to sweep out small quantities of gases, such as air, when such purging substances volatilize. It is known that large bubbles of gas pass more quickly through a dental cream which is under vacuum or being subjected to centrifuging or other force-increasing operation and therefore, the use of volatile bubble-forming compounds has been known and practiced in the preparation of dentifrices and similar materials from which gas removal is desirable. Some combinations of such methods have been utilized to effect superior degassing.

In accordance with the present invention a method for the manufacture of a gas-free paste or gel dentifrice comprises making a mixture of a liquid medium, gelling agent and polishing agent, degassing the mixture, preparing a mixture of synthetic organic detergent and liquid medium therefor, degassing said mixture, most preferably at an elevated temperature, and admixing the mixtures. In preferred embodiments of the invention, opaque or visually clear (transparent or translucent) dentifrice products are made in gas-free form by making the first mixtures from glycerol and/or sorbitol, an organic gelling agent, such as sodium carboxymethyl cellulose, and other polyhydric alcohol-soluble ingredients present, too, admixing with inorganic polishing agent, such as dicalcium phosphate, for manufacturing opaque dentifrices, or sodium aluminosilicate or silica xerogel, when making transparent or translucent dentifrices, and, in the second mixture, utilizing as the synthetic organic detergent sodium lauryl sulfate and/or sodium N-lauroyl sarcoside. In preferred embodiments of the invention, degassings are effected accompanied by applications of vacuums, although in some circumstances, centrifuging might also be desirable, preferably with vacuum. To obtain improved degassing effects, one may utilize sequential or stepwise additions of portions of the organic detergent mixture to the rest of the formulation, less essential oils and other flavors. The synthetic organic detergent solution is made essentially gas-free by heating it and usually then holding it for a sufficient time to allow the removal of all gases, before it is admixed with the other dentifrice constituents. In some aspects of the invention it may be desirable to add solvents or flavoring agents to aid in expelling gases therefrom before final admixings are effected. In other instances, the flavoring agent may be added to the essentially degassed product as a last step in the manufacturing operation.

Dentifrice formulas of various types may be made in accordance with the procedures of the present invention. A variety of contents of the usual main constituents may be used, including polishing agents, such as dicalcium phosphate, silica xerogels and complex aluminosilicate salts, e.g., sodium aluminosilicates; vehicles, usually including humectants, such as glycerol, liquefied sorbitol (often as a 70% aqueous solution) or other liquid polyols, and often also including water; gelling agents, generally organic or inorganic gums or finely divided hydratable materials; flavoring agents; and other constituents for their cosmetic, therapeutic or aesthetic properties. However, although many dentifrice constituents are available, almost all dental creams or toothpastes which are in substantially form-retaining, extrudable condition will include at least the first three classes of mentioned ingredients, polishing agent, vehicle and gum, gelling agent or thickener. When large quantities of polishing agents are used in the opaque dentifrices based on dicalcium phosphate or equivalent inorganic polishing material, the amount of vehicle plus water is usually comparatively small. The reverse situation obtains when, as in the clear dentifrices, lesser proportions of polishing materials are utilized. However, water may be present in small quantities in the clear products. The amounts of flavoring materials, colorants and therapeutic constituents are generally small, rarely exceeding 5% each and often being less than 2% of the composition.

The polishing agents are usually finely divided water insoluble powdered materials of particle sizes such that they pass a 140 mesh screen, U.S. Standard Sieve Series. Preferably, they are from 1 to 40 microns, most preferably from 2 to 20 microns in particle sizes, with distributions of particle sizes being normal over the ranges.

Among the polishing agents that are useful in the preparation of dentifrices may be mentioned dicalcium phosphate, tricalcium phosphate, insoluble sodium metaphosphate, crystalline silica, colloidal silca, complex aluminosilicates, aluminum hydroxide (including alumina trihydrate), magnesium phosphate, magnesium carbonate, calcium carbonate, calcium pyrophosphate, bentonite, talc, calcium silicate, calcium aluminate, aluminum oxide, aluminum silicate, and silica xerogels. In the cases of many of such ionic polishing agents corresponding alkali metal or alkaline earth metal salts are useful and may be employed. The above listing of polishing agents and other listings of other constituents of the dentifrice composition to be given in the present specification are not intended to be exhaustive and therefore, for other materials of these types reference should be made to a standard handbook, such as *Cosmetics: Science and Technology*, by Sagarin, 2nd printing, 1963, published by Interscience Publishers, Inc. Most of the polishing agents mentioned are most useful in the preparation of opaque dentifrices but some of them, such as the colloidal silicas, especially the silica xerogels, and complex sodium aluminosilicates, may be utilized in the manufacture of clear dentifrices, because their indexes of refraction approximate those of the rest of the dentifrice constituents in an appropriate vehicle.

The content of polishing agent in the final dentifrice product is variable, generally being greater for the opaque than for the translucent or transparent dental gels. For example, in the manufacture of commercially acceptable opaque form-retaining, extrudable dental creams there usually will be present 20 to 75% of polishing agent, e.g., dicalcium phosphate, but in the manufacture of clear dental gels, also form-retaining and extrudable, the content of polishing agent is typically from 5 to 40%. The preferred proportions of such constituents are 40 to 60% and 10 to 30%, respectively. In the case of the polishing agent for opaque products, a most preferred composition includes hydrated dicalcium phosphate and anhydrous dicalcium phosphate, with the latter being present to the extent of about 5 to 20% of the total dicalcium phosphate content. With respect to the transparent or translucent dental gels, either sodium aluminosilicate complex or silica xerogel will usually be employed separately, although mixtures thereof may find special advantages in some products where the desired polishing properties may be so regulated. It will be seen that the polishing agents utilized in accordance with the invention are normally water insoluble inorganic metal oxides, hydroxides, salts and hydrates but water insoluble organic compounds may also be employed in substitution thereof, although usually for only minor proportions of the total polishing agent. For example, polyacrylamides, polymethyl methacrylates, polyesters and nylons may be utilized.

Of the water insoluble polishing agents, most are well known chemical compounds. The complex aluminosilicate salts, which appear to contain interbonded silica and alumina having Al-O-Si bonds, are described by Tamele, in "Chemistry of the Surface and the Activity of Aluminum-Silica Cracking Catalysts," appearing in *Discussions of the Faraday Society*, No. 8, pages 270-279 (1950), particularly at page 273, Fig. 1, Curve 3, and in the article by Milliken et al., entitled "The Chemical Characteristics and Structure of Cracking Catalysts," in *Discussions of the Faraday Society*, No. 8, 279-290 (1950), particularly in the sentence bridging pages 284 and 285. The colloidal silicas used are silica xerogels. Typically, they contain up to about 20% of water, have a refractive index of 1.44 to 1.47 and a loose bulk density of about 0.07 to 0.12 g./c. cm. and are of particle sizes of 1 to 20 microns. Appropriate xerogels have been marketed under the trademarks Syloid 63 and Syloid 74.

The gelling agents used to make the dentifrices of the present invention are known in the art and include the natural and synthetic gums and gum-like materials, such as alkali metal carboxymethyl cellulose, hydroxyethyl carboxymethyl cellulose, polyvinyl pyrrolidone, Irish moss, gum tragacanth, hydroxypropyl methyl cellulose, methyl cellulose, starches, starch glycolates, polyvinyl alcohol, alginates, carob bean gums, the hydrophilic colloidal carboxylvinyl polymers, such as those sold under the trademarks Carbopol 934 and Carbopol 940, diatomaceous earths, bentonite and other natural clays (these also may function as polishing agents), proteinaceous materials, either animal- or vegetable-derived, and synthetic inorganic clays, such as the silicated clays sold under the trademarks Laponite CP and Laponite SP. Certain colloidal silicas such as the aerogels, Syloids 244 and 266 and Aerosil, and pyrogenic silica, sold as Cab-O-Sils, may be used also for thickening or gelling properties. Of course, as with the other constituents of the dentifrices, mixtures thereof may be employed to obtain specially desirable properties in the product. Generally, the gelling materials utilized are gellable with water or alkanols, especially with polyhydric alcohols, such as glycerol and sorbitol. Usually the gel is formed with at least some water present.

The proportions of gelating agents or thickeners in the present dentifrices are sufficient to form an extrudable, shape-retaining product which can be squeezed from a tube onto a tooth brush and will not fall between the bristles of the brush but rather, will substantially maintain its shape thereon. In almost all cases no more than 5% of gelling agent need be used and in most instances from 0.1 to 3% will suffice, with the preferred range, especially applicable to sodium carboxymethyl cellulose, being from 0.3 to 1.5%.

The liquid vehicle of the dentifrice, together with the gelling agent(s) and other constituents, forms an extrudable mass of a non-dripping consistency when extruded from a collapsible tube, such as an aluminum or lead tube. Thus, by the addition of more vehicle, the dental cream can be thinned and conversely, by the addition of more solids, especially more gelling agents, the products can be thickened. In most dentifrices, the liquid portion comprises water, glycerine and sorbitol, with the last usually being added in aqueous solution, or various suitable mixtures thereof. In the present description the vehicle will be considered as distinct from the water. Although it is preferred to employ mixtures of glycerol and sorbitol, other suitable vehicles may also be present, either with the mentioned polyhydric alcohols or in replacement of them. Thus, propylene glycol, polyethylene glycol, mannitol and polypropylene glycols may be employed, providing that they are physiologically acceptable and produce products having a desired refractive index, in the case of manufacture of visually clear dentifrices. Normally, the proportion of vehicle is determined by the physical properties of the extrudate. Usually, however, from about 10 to 85% of the vehicle will be employed, with from 10 to 35% being a typical range for production of opaque dentifrices and from 40 to 85% being useful for the manufacture of clear dental preparations. Preferred ranges are, respectively, from 15 to 30% of the polyhydric alcohols for the opaque dentifrices and from 50 to 75% in the clear products. In the opaque products it is preferred that the glycerol:sorbitol ratio, if both these polyhydric alcohols are present, should be from 0.3:1 to 10:1 and in the clear products from 1:5 to 5:1, more preferably from 1:3 to 1:1.

The water content of the product, including free water present with the sorbitol solution, in the synthetic detergent mixture and in any other constituents, often is greater for the opaque products than for the clear products. Thus, for the opaque dentifrices the water content may range from 5 to 35% but will usually be about 8 to 30%, preferably from 20 to 30%. With respect to the clear dentrifrices, this range may be from 0 to 30% but will normally be from 10 to 20%, most usually about 15 to 20%. The water employed will preferably be deionized water and usually is irradiated with ultraviolet light to assure sterility of the product. In a similar manner, if considered important, the entire product may similarly be irradiated while being mixed, degassed or otherwise processed, so as to decrease bacterial counts.

The synthetic organic detergents or surface active agents which may be employed in the present compositions assist in emulsifying or otherwise dispersing the components of the dentifrice uniformly and add their cleaning action to the product. In some cases they are germicidal and aid in prophylaxis. Although the organic surface active materials used may be anionic, nonionic, ampholytic or cationic, it is generally preferred to employ, at least as the major detersive constituent, either an anionic or a nonionic material, or a mixture thereof, and of these, the anionics are highly superior in most compositions. In addition to their desired surface active, emulsifying and detersive effects, such materials impart to dentifrices good foaming properties. Generally, they will include long chain fatty or poly-lower alkoxy groups, plus hydrophilic radicals. Usually, the anionic detergents will be in the forms of salts, especially water soluble salts of akali or alkaline earth metals. Among the useful anionic detergent materials may be mentioned the higher fatty acid monoglyceride monosulfates, such as the sodium salts of the monosulfates of monoglycerides of hydrogenated coconut oil fatty acids, higher alkyl sulfates, such as sodium lauryl sulfates, alkyl aryl sulfonates such as sodium linear dodecyl benzene sulfonate, olefin sulfonates, such as sodium higher olefin sulfonate in which the olefin group is of 12 to 21 carbon atoms, higher alkyl sulfoacetates, higher fatty acid esters of 1,2-dihydroxy propane sulfonates, the substantially saturated higher aliphatic acyl amides of lower aliphatic aminocarboxylic acid compounds, such as those having 12 to 16 carbon atoms in the fatty acid, alkyl or acyl radicals, higher alkyl poly-lower alkoxy (of 10 to 100 alkoxies) sulfates, higher fatty acid soaps and the like. In this specification for convenience and ease of presentation, the soluble soaps are considered to be synthetic organic detergents. Examples of the mentioned amides are N-lauroyl sarcosine and the sodium, potassium and ethanolamine salts of N-lauroyl-, N-myristoyl- and N-palmitoyl sarcosine. In the above descriptions, "higher" refers to chain lengths of 12 to 22 carbon atoms. If course, in broader embodiments of the invention sulfuric reaction products which include long chain hydrophobic groups and hydrophilic radicals are also useful and such compounds are well known. See the text *Surface Active Agents*, Vol. II (1958), by Schwartz, Perry and Berch.

Among the nonionic materials which have been found to be useful detergents are those including chains of lower alkylene oxides, e.g., ethylene oxide, propylene oxide, in which there are present from 10 to 100 or more moles of lower alkylene oxide. Among such materials are the block co-polymers of ethylene oxide, propylene oxide and propylene glycol, sold as Pluronics, the alkyl phenyl polyethoxy ethanols, sold as Igepals, the mixed copolymers of ethylene oxide and propylene oxide, sold as Ucons, and various other well known nonionics derived from fatty alcohols or acids and polyethylene oxide. The amphoteric agents and cationics, which may sometimes be present, although usually it will be desirable to avoid the presence of cationic detergents together with anionic materials, include quaternized imidazole derivatives, sold as "Miranols, such as Miranol C₂M" and cationic germicides, such as di-isobutylphenoxyethoxyethyl dimethyl benzyl ammonium chloride, benzyl dimethyl stearyl ammonium chloride and tertiary amines having a higher fatty alkyl group and two polyoxyethylene groups attached to the nitrogen thereof.

The detergents constitute from 0.5 to 5% of the dentifrice in most cases, although in some instances slightly larger proportions of detergent may be utilized. Rarely, however, will this be greater than 10%. In preferred embodiments of the invention, the detergent content may be decreased to about 1 to 3%. The most preferable detergents utilized are sodium lauryl sulfate or myristyl or palmityl sulfates and sodium N-lauroyl sarcoside, or the myristoyl or palmitoyl compounds. Among highly preferable formulations are those in which mixtures of these two different types of detersive materials are employed.

When nonionics are utilized, they will normally be from 0.1 to 3% of the product, preferably from 0.5 to 2% thereof. The amphoterics and cationics can normally be present in proportions less than 2%, preferably less than 1%, but generally more than 0.1%.

The flavoring materials employed, in addition to sweetening agents, are largely essential oils but also may include various flavoring aldehydes, esters, alcohols and similar materials known in the art. Examples of the essential oils include oils of spearmint, peppermint, wintergreen, sassafras, clove, sage, eucalyptus, marjoram, cinnamon, lemon, lime, and orange. Also useful is sodium methyl salicylate. Various solvent materials which may be present to aid in degassing operations might also possess flavoring properties but these are not included as flavors in the present description. Thus, ethanol, ethylene chloride, various halogenated aerosol propellant materials such as Propellants 11, 12, 114, 122, and chloroform may be used and may contribute some flavor or tang to the product. Such materials are designated elsewhere herein as solvents, rather than flavors.

The proportion of flavoring material present in the final composition will usually be from 0.5 to 2.5% thereof, as essential oil flavoring ingredients, although in some cases a larger proportion, up to 4% of essential oils, may be utilized. In addition to such flavors, sweetening agents may be present, including sucrose, lactose, maltose, saccharin, perillartine and calcium and sodium cyclamates. Sorbitol, which is a vehicle within the meaning of this specification, also exerts a sweeting effect. A preferable sweeting material is saccharin and usually from 0.05 to 0.3% of that will be suffient to satisfactorily sweeten the dentifrices. When utilizing the other sweeting agents, from 0.1 to 10% thereof may be employed, as in the cases of the sugars.

The amount of volatile solvent employed will usually be from 1 to 10% and will preferably be from 1 to 5%. As exemplifications of the solvent may be mentioned the aerosol propellants, which are halogenated hydrocarbons, usually chlorinated-fluorinated hydrocarbons, ethylene chloride, dichloromethane, tetrachloroethane, iodoform, chloroform and bromoform. Also useful are the lower monohydric alcohols and aldehydes, as well as lower alkanol esters of lower carboxylic acids. Usually, for the purposes of this invention a solvent should be sufficiently volatile so that it may be removed from the dentifrice during processing, if so desired. In most cases, the volatile solvents should have boiling points, at atmospheric pressure, of 80° C. or less, although solvents with boiling points, at atmospheric pressure, of 100° C. or even more may also be used, under appropriate circumstances. Generally the boiling points will be above 40° C. and a preferable range is from 50 to 70° C. In some instances, as with ethanol, chloroform, and methylene chloride, the solvent may be allowed to remain, at least in part, in the dentifrice for its flavoring, preservative or other effects. In this respect, a preferred solvent for particular dentifrices may be chloroform. A tendency of some of the solvents to remain in the product will sometimes dictate either that it be employed or avoided. A preferred range of chloroform content, when its presence is wanted, is from 1 to 5%, more preferably from 2 to 4%. Usually from 5 to 100% of the solvent will be lost in processing, depending on degassing times, and vacuums, plus viscosities of the dentifrices and capabilities of the equipment employed. The proportions of flavoring agents, solvents and other materials described in this specification are given with respect to the final product, unless otherwise indicated and therefore, additional amounts of materials to replace those which may be volatilized and lost, including water, solvents and flavors, will usually be employed in the manufacture of the dentifrices, so as to have the product of the desired formula.

A wide variety of adjuvant materials may also be present in these dentifrices. For example, pH regulating materials or buffers can be employed, such as tetrasodium pyrophosphate, which also has a cleaning effect. The content of such material will usually be from 0.1 to 0.5%. Preservatives, generally at a level of 0.05 or 0.1 may be used. Among these are sodium benzoate, formaldehyde, bactericides, fungicides, etc. Other useful adjuvants include therapeutic materials, such as fluorine-containing compounds, which protect the teeth against decay. Examples of these are sodium fluoride, stannous fluoride, potassium fluoride, ammonium fluoride, and complex fluorides, especially sodium monofluorophosphate. Proportions thereof will usually be from 0.01 to 1% by weight, based on the water soluble fluoride content thereof. The antibacterial agents which are useful include $N^1$-(4-chlorobenzyl)-$N^5$-(2,4-dichlorobenzyl)biguanide; p-chlorophenyl biguanide; 4-chlorobenzhydrylguanylurea; 1,6-bis(2-ethylhexylbiguanido)hexane; 1,6 - bis(p - chlorophenylbiguanido)hexane; and 5-amino - 1,3 - bis(2-ethylhexyl)-5-methylhexahydropyrimidine, and non-toxic acid addition salts thereof. Other useful adjuvants include coloring and whitening agents, dyestuffs, pigments, other preservatives, silicones, chlorophylls, ammoniated compounds, e.g., urea, diammonium phosphate, decorative suspended materials, e.g., finely ground mother-of-pearl, fillers (soluble salts), lubricants, e.g., mineral and other oils, and stabilizers for the compositions.

Within the ranges of components described previously, those skilled in the art of manufacturing of dentifrices will be able to select those formulations of most desirable characteristics, whether opaque or clear. In either case, it will normally be desirable to degas a dentifrice, and by the present method superior gas removal is obtainable. To effect this removal of entrained insoluble gases, e.g., nitrogen, oxygen, air, carbon dioxide, argon, it has been found important to effect degassing with respect to components of the final product, as well as the ultimate dentifrice. Particularly useful has been the degassing of detergent solution or slurry prior to its addition to the rest of the dentifrice constituents. Solvents may be added to such mixture and to the final product and intermediate mixtures to facilitate gas removal. By this technique the dentifrice can have gas content minimized and gas removal problems may be overcome to a great extent before a final degassing, by preventing additions of gases to the dentifrice compositions during manufacture.

The detergent solution or slurry in liquid medium, such as water and/or polyol, may be made essentially gas free by heating it at atmospheric pressure or under vacuum or by vacuum degassing but the use of heat is highly preferable to obtain best results. The temperature to which it may be raised will usually be from about 30 to 95° C. and preferably 60 to 95° C., but can be as high as within about five degrees of the boiling point of the mixture (solution, slurry or dispersion), but not over the boiling point, absent any decomposition. Vacuum may be utilized and will normally be within the range of 200 to 700 millimeters of mercury (60 to 560 mm. Hg, absolute) but vacuums from 100 to 760 mm. Hg may be used, too. If vacuum is employed, the temperature to which the detergent solution is raised may be lower. Of course, elevating the temperature will also diminish the solubilities of most gases and assist in their removal. Normally, to effect useful gas removal from detergent solution, it is subjected to heat and vacuum treatment, if that is used, for a period of from one minute to 24 hours, preferably being maintained at elevated temperature for from five minutes to one hour, depending on the type of equipment employed, the degree of surface exposure of the detergent to the heating environment, etc. Generally, if the detergent is merely allowed to stand in a container in a hot room, the time of heating or such standing will be from ¼ to 8 hours, but it can be from 1 to 24 hours if the detergent is heated to temperature from a cold or comparatively cool state. It has been found that the heating releases essentially all of the gases from the detergent and prevents this material, when admixed with the other dentifrice ingredients, from causing the presence of undesirable gas bubbles in the final product. Any such bubbles can also be substantially removed with the aid of a solvent. In many cases, quiescent heating at atmospheric pressure is preferred to avoid any redissolving or redispersing of the gas. Also, the detergent and the liquid medium for it or one of these may be heated before admixing, which will further decrease the time needed for gas removal.

The detergent solutions or slurries that are treated are usually clear solutions and generally contain polyhydric alcohol(s), as well as water and active ingredients. On a detergent mixture basis, these normally will comprise from 10 to 50% water, 10 to 40% synthetic organic detergent and 10 to 60% of polyhydric alcohol. However, the solution can be completely aqueous, as when the polyhydric alcohol vehicle is all admixed with the gelling agent, polishing agent, etc. It can also be substantially non-aqueous, as when the water is used with the gelling and polishing materials. The water is preferably deionized and irradiated, the synthetic detergent is either an anionic or nonionic detergent or a mixture thereof, possibly with small amounts of amphoteric or cationic detergent or other surface active agent present, typically avoiding mixtures of cationics and anionics, and the polyhydric alcohol will usually be glycerine, propylene glycol, sorbitol or a mixture thereof. In preferred compositions water content will be from 20 to 40%, the synthetic detergent will be from 10 or 20 to 35% and the polyhydric alcohol will constitute from 20 to 50% of the solution. The detergent solutions are especially amendable to being degassed by this method and, with the contents of polyhydric alcohol and water are more readily admixed with the rest of the dentifrice ingredients without entraining gas in the dentifrice composition.

Prior to addition of the detergent solution, which may be made hot or cold, it is desirable to degas the other constituents. This may be successfully effected by holding a polyhydric alcohol solution or suspension of gelling agent or thickener to which polishing agent has been added under vacuum until the gas has been removed therefrom. If desired, this may be done at an elevated temperature. In a two-step process, which is one that has been preferred, the polyhydric alcohol suspension of gelling agent, including polishing agent but without the detergent, is subjected to a vacuum of 500 to 760 millimeters of mercury for a period of time sufficient to remove essentially all of the gases therein. Such time will often be as little as 10 seconds but may be as long as five minutes or even an hour, in some circumstances. Equipment employed for degassing may be of any suitable available type. Of course, proportions of water and polyhydric alcohol in the preliminary solution of gelling agent will be determined by the desired end formula and the proportions of such materials employed with the detergent solution. Generally, from 10 to 90% of the water and the polyhydric alcohol, preferably from 30 to 70% thereof, will be utilized in the preliminary gelling agent solution and the complementary proportions will be employed in the detergent solution. Although degassing may be at ambient temperature, it is preferably effected at from 30 to 95° C.

In any of the mentioned pre-mixes, suitable constituents of the detergent composition may also be included, such as adjuvants or preservatives, bactericides and other therapeutic agents, anti-oxidants, sweeteners, etc. Additions of such materials will generally be regulated by the solubilities or ready dispersibilities thereof in the water or vehicle employed. In stepwise additions of detergent material to the rest of the dentifrice, less solvents and flavors, usually enough detergent will be employed to satisfactorily wet the mix with, at the most, two or three partial additions of the detergent. Generally up to ½, e.g., 2 to 20 or 2 to 50%, of the detergent will be admixed with the other main ingredients, after which addition, vacuum is resumed and the rest of the detergent mix is added.

Additions may be effected at room or elevated temperatures and vacuum may be applied thereafter to draw out any entrained gases. Vacuum times may be short, such as from 1 to 5 minutes. Solvent and flavoring materials may optionally be added at earlier steps than the end of the process. If this is done, however, there will be a risk of a loss of appreciable amounts of them. However, a compensating benefit may be in faster degassing of the dentifrice. The proportions of these materials used will usually be divided so that no more than ⅓ is in the gel solution or suspension, less than an additional ⅓ is the polyhydric alcohol-gelling agent-polishing agent mix, and no more than ⅓ extra is added to the entire formula, less flavor. Preferably, the main proportions of the solvents and flavoring agents will be added after completion of making of the whole degassed dentifrice, less flavoring agent.

For those compositions wherein it is considered important to avoid loss of flavoring agent and/or solvent, such materials are added after the completion of the mix and degassing of the entire formulation. Preferably, such additions are effected to the dentifrices under the vacuums described and at the mentioned temperatures but use of room temperature blendings is within the invention. Mixing is usually continued for a maximum of 15 minutes thereafter and most preferably, from one to five minutes of mixing under vacuum and elevated temperature should be employed to conserve the essential oils of the flavor.

Many types of apparatuses for mixing and applying vacuum to the pre-blends and final dentifrice compositions may be employed. Various makes of such equipment are available, including Dopp mixers, Unimix mixers and Versators. The Unimix apparatus is described in *Process Engineering*, Sept. 11, 1970, at pages 81–85, and has been found to be particularly useful for the present purposes. In such an apparatus a mixing tool is rotated around the inner wall of a vessel and is followed by a scraper blade which insures that the working surface of the apparatus is quickly scraped clean and the cleaned off material is blended back with the mix. Thus, no "dead" spots exist in the mixer. Because of close clearances between the mixing blades and the wall of the mixer the thickness of material left on the wall will generally be held to about 0.2 cm. This also aids in removing air from the mix, since bubbles are cut through by the mixers, allowing the air bubbles to break and be withdrawn as gas. The scraper blade is preferably coated with or made from a plastic, such as polytetrafluoroethylene, which is compatible with the various dentifrice ingredients. Utilization of a hydraulically operated, vacuum-tight cover allows the entry of very little, if any, air during mixing and permits the application of a high vacuum, which may be generated by a standard vacuum pump or by connection to a plant vacuum line. The various materials may be blended in the mixing apparatus, both as pre-blends and final mixes. In some instances, it may be desirable not to employ vacuum but in most cases the use of vacuum will aid in degassing of the product in accordance with Stokes' Law principles. If desired, the apparatus may be employed to blend ingredients at room temperature but for degassing operations the use of a higher temperature is much preferred. The products of the present invention can be processed very quickly, at speeds sometimes two to five times those possible with prior art techniques. Such improved throughputs and better degassing operations are attributed to the stepwise utilization of vacuum with various pre-blends of the types described. Degassing of the various components before admixings remove gases before they become seriously entrained in the thickened dentifrice. The heat and vacuum combinations facilitate gas removal, as does the addition of a coalescing solvent, which helps to drive out the entrapped air with the solvent bubbles, which, in accordance with Stokes' Law rise more quickly through the dentifrice than the smaller air bubbles. Desired effects can be obtained with substantially the same equipment, as is generally available to the dentifrice manufacturing art. The products produced are particularly pleasing, stable, of good viscosities and extrusion properties and such properties are adjustable by regulation of the extent of air removal and changes in formulation, especially with respect to gelling agents. It is feasible to degas these dentifrices without adding possibly unwanted solvents or flavor. In those cases where the presence of certain solvents or flavors may be objectionable in the product after manufacture, this is an important feature.

The following examples illustrate the invention. All parts are by weight and all temperatures are in ° C., unless otherwise indicated.

EXAMPLE 1

A clear dentifrice is made of the following formula:

| | Percent |
|---|---|
| Glycerol | 25.0 |
| Sodium carboxymethyl cellulose (Hercules 12M31P) | 0.6 |
| Sodium benzoate | 0.5 |
| Sorbitol (70% aqueous solution) | 43.9 |
| Dye (1% aqueous solution) | 0.8 |
| Water, deionized | 3.0 |
| Sodium saccharin | 0.2 |
| Pyrogenic silica (Cab-O-Sil M-5) | 2.0 |
| Silica aerogel (Syloid No. 244) | 4.0 |
| Sodium aluminosilicate (DeGussa P820) | 16.0 |
| Sodium lauryl sulfate | 2.0 |
| Flavor (Essential oils) | 1.0 |
| Chloroform | 1.0 |

The sodium carboxymethyl cellulose, sodium saccharin and sodium benzoate are mixed together. Seventeen parts of the glycerol (17% of the final composition) are added to a mixing vessel of the Dopp type, equipped with heating and vacuum means, and, while the glycerol is being circulated by the mixer the premix of the mentioned solid constituents is added to the mixer. After dissolving or suspending of the ingredients in the glycerol the mixer is turned off and the sorbitol solution and dye solution are added, after which mixing is renewed, with heating to 50° C. After reaching the mentioned temperature, mixing is continued for an additional twenty minutes. The product resulting is a slurry of gelled CMC but by using less or by adding water a clearer mixture may be made which is a gel or solution. The term "mixture" is used herein to be generic to solutions, slurries, gels, dispersions, etc. Instead of performing the initial mixing in a Dopp mixer, other mixers may be used, preferably also with a peripherally rotating blade and a surface scraper such that less than 0.2 centimeter of material is not scraped off the surface of the mixer wall. Also, mixing can be effected in an ordinary tank with a central mixing blade, providing that before addition of polishing agent the mixture is transferred to a mixer of the Dopp, Unimix or equivalent type, in which deaeration may be effected.

After the mix is in the Dopp mixer, the silica aerogel and the pyrogenic silica, with the sodium aluminosilicate, are added to the mix. Such addition may be in the sequence mentioned or a premix of the three powders may be admixed with the gel mixture. The addition of the powders is accompanied by mixing and the mixing is continued for about five minutes or otherwise for a sufficiently long time to satisfactorily wet the powders and distribute them evenly throughout the medium. Water can be added to the mix of powders in glycerol at this stage but is preferably added with the sorbitol in the making of the gel before the polishing agent and thickener powders are added. After wetting of the powders is achieved, deaeration is begun by opening the vacuum line to the mixer and allowing the vacuum to build to 730 mm. Hg (30 mm. Hg absolute pressure). It is held at that pressure and at desired temperature (about 50° C.) for about four minutes but less time, as little as 30 seconds, also often allows for good deaeration.

Meanwhile, the glycerine solution or other mixture of sodium lauryl sulfate detersive material is prepared. Preparation is by a simple mixing of the ingredients at room temperature, followed by heating to a temperature between 30° C. and 95° C. The glycerin is first heated and the detergent is admixed with it. The preferred usual temperature employed is about 40° C. to 90° C. At this temperature range there appears to be a phase change of the mixture and it clarifies, at which time the entrained or dissolved gasses appear to be gone. Heating of the previously cold glycerine-detergent mixture is effected in the present case in a hot room at 70° C. for a period of about 8 hours or at 90° C. for a shorter time, e.g., 1 hour, to raise the glycerol to 70° C.

The detergent solution, essentially free of air, does not require further vacum deaeration but such is sometimes effected at about 700 mm. Hg vacuum for about 2–3 minutes, if desired, or vacuum may be employed during the heating. Similarly, the detergent solution component(s) is/are heated before admixing to prevent initial incorporation of gases. The detergent solution produced, free of air, is added to the previously deaerated polyhydric alcohol (or other liquid medium)-gelling agent-polishing agent mixture and full vacuum of 730 mm. Hg is recovered. In other experiments, the detergent solution is made by using the water, some of the glycerine and some of the sorbitol with the detergent to make 20% solution of the sodium lauryl sulfate, with the balance being 35% water, 30% glycerine and 15% sorbitol and heating to a temperature between 30° C. and 60° C. This detergent mixture is degassed in the same manner as previously described except for the use of a lower temperature and the addition of the mixture to the rest of the formulation in two steps, one containing about 30 to 50% of the detergent and other containing the remainder. The vacuum is restored to full magnitude between additions. Preferably, equal amounts of detergent mixture are added in each step. Whichever of these methods is employed, the final product is essentially the same.

After the addition of the detergent mixture and deaeration, which takes about ten minutes, additional application of vacuum may be used, for about five additional minutes so as to make sure that any air or other gas that might have entered the mixer during additions is removed. Then, flavoring or other additives are incorporated in the dentifrice and at this stage chloroform is added. Vacuum is re-applied but is held for only a short time, 1 minute, to avoid vaporizing off excessive amounts of volatiles.

The product obtained is cooled to room temperature either before or after packing in flexible walled tubes. When extruded from the tubes it appears as a clear dentifrice, apparetnly because the polishing agent and other undissolved solids have indexes of refraction about the same as that of the dentifrice medium employed. Also, the clear gel dentifrice is not made opaque or unclear by the presence therein of air or other insoluble gas bubbles.

The operations for the removal of gases, conducted as described in the aforegoing example, are quick, simple, efficient, capable of being effected in existing equipment employed in the dentifrice and are inexpensive. They do not require the consumption of solvents or the use of excess flavors to promote gas release. Because the premixes are gas-free or substantially so, the mixers employed may be smaller in capacity, since allowances do not have to be made for frothing or expanding of the mixes when air escapes due to imposition of vacuum. Also, the full vacuums to be utilized may be applied quickly without fear that any wetted product will be sucked out the vacuum lines.

In variations of the operations described in this example, solvents may be employed, different ingredients may be used and temperatures and vacuums may be altered within the ranges described in the specification. Thus, when 1 to 5% of solvent, e.g., 3% of ethanol or chloroform, is added with the detergent solution or is added to any portion of the composition, application of the "final" vacuum may be for a shorter period of time, e.g., 2 minutes, because the solvent helps gas removal to be effected quickly. By "final" vacuum is meant that on the product after it is complete except for addition of flavors.

When silica xerogel is used in place of the aluminosilicate, in the same proportion, a satisfactory clear gel dentifrice is also produced. This is the case when the sodium carboxymethyl cellulose thickener is replaced with Irish moss (frequently half a much will be sufficient), hydroxypropyl methyl cellulose or other mentioned thickener. If usual polishes for opaque dentifrices are employed deaeration is effected but the products are opaque, too. Such polishing agents include dicalcium phosphate, calcium aluminate, anhydrous alumina, and calcium carbonate. The adding of a preservative, such as a propionate, will supplement the action of the benzoate. Then, too, the proportions of the mentioned ingredients and their supplements or replacements may be varied, usually over a ± 20% range, without loss of desirable properties in the finished dentifrice. Similarly, times, temperatures and vacuums are varied over the mentioned and good processing and products are obtained. If desired, the chloroform added with the flavor may be omitted or may be added at an earlier step in the process for its solvent activity. Of course, if expensive solvents are employed they will be recovered for reuse after aiding in the removal of the gases.

Although sodium lauryl sulfate is a preferred detergent or foaming agent in the present clear gel dentifrices and may be employed alone, it can be completely or partially replaced in the above formulation with other such materials, e.g., sodium coco-monoglyceride sulfate, sodium coconut oil alcohol sulfate, sodium N-lauryl sarcoside and other water soluble alkali metal and alkaline earth metal detergent salts. One such formula contains equal proportions of the lauryl sulfate and the sarcoside.

EXAMPLE 2

|  | Percent |
|---|---|
| Glycerol | 24 |
| Sodium benzoate | 0.5 |
| Sodium saccharin | 0.2 |
| Irish Moss (Viscarin GM-C) | 0.3 |
| Sorbitol (70% aqueous solution) | 42 |
| Silica aerogel (Syloid 244) | 3.0 |
| Water, deionized | 7.6 |
| Silica xerogel (Syloid 74) | 18.0 |
| Clove flavor | 1.2 |
| Sodium lauryl sulfate | 2.0 |
| Chloroform | 1.0 |

A product of the above formula is made according to the method of Example 1, except that the clove flavor is admixed with the polishing agent (Syloid 74) and the dye solution before that combination is admixed with the polyol-thickener mixture, containing various adjuvants. The sodium lauryl sulfate slurry to be degassed is 20% by weight of the detergent, with the balance being glycerol or half glycerol and half sorbitol solution. Instead of adding chloroform last, it is sometimes omitted entirely or is added earlier in the process, e.g., with the flavor and colorants, so as to act as a solvent and to promote gas removal.

The clear dentifrice produced by the method and formula given is a good cleanser for the teeth and is of attractive transparent or visually clear appearance. It is readily extrudable from a flexible tube and when the tube is also clear the product looks clean and pure to a purchaser. Furthermore, because of excellent density control due to the absence of air bubbles, the product can be accurately metered into the tubes on a weight basis, without the need to overfill to compensate for light product from entrained air.

This formula is changed to include other polyols, foaming agents, polishing agents and flavors, in accordance with the teachings of the specification, and the products obtained are also good transparent dentifrices, providing that the polishing agent is selected to have an index of refraction like that of the medium employed. The materials of Example 1 may be used in the products of Example 2 to produce acceptable transparent dentifrices. In a specific variation of the formula of Example 2, sodium carboxymethyl cellulose is used instead of the Irish moss, the silica xerogel is replaced with Syloid 63, and the amount of solvent is increased to 3% (solvent being Freon 11) in replacement of the chloroform and some sorbitol. The product is a good clear dentifrice and remains as acceptable when the foaming agent is replaced with sodium lauroyl sarcoside or is 40% replaced with a nonionic compound, e.g., Pluronic F–68 or Pluronic L–44.

EXAMPLE 3

|   | Percent |
|---|---|
| Glycerol | 22.0 |
| Sodium carboxymethyl cellulose (7MF, Hercules) | 0.8 |
| Sodium benzoate | 0.5 |
| Sodium saccharin | 0.2 |
| Water | 22.4 |
| Alumina, hydrated | 52.0 |
| Sodium lauryl sulfate | 1.5 |
| Peppermint flavor | 0.6 |

The formula is made by essentially the same method as described in Examples 1 and 2, with allowances being made for the different formulas being used. The addition of the detergent mixture is in two equal steps. In some embodiments the polishing agent is added to the rest of the mixture just before admixing in of the flavor. However, because of the very fine sizes of the particles, e.g., 1 to 20 microns, the same as for the other polishing agents used, the large amount of polishing agent present and its lightness, care is exercised to prevent loss of powder when vacuum is applied. The temperature to which the detergent mix is heated is as high as possible without decomposition, e.g., 90° C. or higher.

The product made is a gas-free dentifrice, containing no gas bubbles, even when subjected to the spatula test or viewed under a microscope or magnifying lens. It is of consistent density and viscosity. It has an excellent shelf stability, generally over 1 year.

In modifications of the formula the foaming agent is 50% replaced with sodium N-lauryl sarcoside, the polishing agent is completely replaced with dicalcium phosphate (90% hydrate), the glycerol is replaced with a glycerol-sorbitol mixture (20% to 80% each), the detergent mixture contains about 30% water, 25% detergent and the balance polyhydric alcohol (other parts of the formula being adjusted accordingly), 0.3% tetrasodium pyrophosphate or other suitable alkaline salt, and coloring dye is added. In some experiments the content of glycerol is lowered to about 5%. Additions of materials are at the expense of the water. The products made are deaerated, following the method of Example 1, after admixing of the polishing agent medium with the detergent mix. Instead of the Dopp mixer, the Unimix apparatus is successfully employed. The last step of the deaeration, after addition of flavor, takes only about two minutes, due to prior deaeration of the constituents of the final mix. Thus, when a chloroform flavor is desired, it is added at this stage and little is lost by vaporization.

EXAMPLES 4, 5, 6

The formulations of Examples 1, 2 and 3 are made by the methods described in those examples with the exceptions that in each case the detergent solution degassed is an aqueous solution of sodium lauryl sulfate, without polyhydric alcohols present. Also, with respect to Example 1, the formula is changed so as to increase the percentage of deionized water to 5% and to diminish the sorbitol solution content to 41.9%. In each case, 30% sodium lauryl sulfate aqueous solutions are made from the sodium lauryl sulfate and water components of the formulation and are deaerated or degassed by heating to 82° C. and holding at this temperature for ½ hour. Excellent degassings are obtained and the degassed detergent solution is admixed with the gelling agent-vehicle-polishing agent-adjuvants mix and the procedures described in Examples 1–3 are followed. Any excess amounts of water are utilized to aid in dissolving or dispersing the gelling agent, polishing agent and adjuvants in the initial mixture made, with which the detergent solutions are subsequently admixed.

No vacuum is found to be necessary to completely deaerate the detergent solutions, although by utilizing the vacuums previously described the time needed for complete degassing is diminished to from 20 to 70%. Also, when a comparison is made with attempting degassing without vacuum at room temperature, using the same detergent solution, it is found that even after 24 hours the degassing is incomplete (about the top third of the solution still contains visible air bubbles).

When the variations of Examples 1–3 are followed and when the synthetic detergent is altered to a 50:50 mixture of sodium lauryl sulfate and sodium N-lauroyl sarcoside; sodium N-lauroyl sarcoside alone; sodium coconut oil fatty acids mono-glyceride sulfate alone; or soap alone; or in mixture with the previously mentioned synthetic detergents; or when up to 20% of the detergent composition is Pluronic F–68 or L–44; rapid deaeration occurs at temperatures over the range of 65–90° C. with the concentrations of detergent(s) in water being from 10 to 50% detergent, preferably from 20 to 40%, the balance being deionized water.

Results like those described in these Examples are obtained when, instead of utilizing water or water-polyhydric alcohol solutions of the detergents, such solutions are in glycerol or other liquid polyhydric alcohol. In such cases, the temperature may be raised to just below the decomposition points of the polyhydric alcohols and the detergents. Normally, when utilizing a vacuum of 200 to 700 mm. Hg in such operations degassing is effected in from 2 to 5 minutes, whereas without the vacuum it may take from 5 minutes to two hours, depending on the temperature, viscosity and proportion of initially entrained air in the mixed components. The products are like those of Examples 1–3.

In the above methods a preferred process of degassing is one wherein the water is pre-heated to 82° C. and the detergent is added to it, with agitation, preferably under the described vacuum. When the process is so modified, degassing times are decreased further in Examples 4–6. Good degassed dentrifrices are made from such detergent when it is admixed with other gas-free components under vacuum. An advantage of the aqueous detergent solutions made is that, unlike the corresponding polyhydric alcohol solutions, they remain liquid at room temperatures.

The invention has been described with respect to various examples thereof but is not to be limited to these or the illustrations or descriptions given because it would be evident that one may substitute equivalents for materials, elements or process steps without going outside the scope of the invention described.

What is claimed is:

1. A method for the manufacture of a gas-free dentifrice containing from 10 to 85% of polyhydric alcohol selected from the group consisting of glycerol and sorbitol and mixtures thereof, 5 to 75% of polishing agent selected from the group consisting of dicalcium phosphate, tricalcium phosphate, insoluble sodium metaphosphate, crystalline silica, colloidal silica, complex aluminum silicates, aluminum hydroxide, magnesium phosphate, magnesium carbonate, calcium carbonate, calcium pyrophosphate, bentonite, talc, calcium silicate, calcium aluminate, aluminum oxide, aluminum silicate and silica xerogels, and mixtures thereof, 0.1 to 3% of sodium carboxymethyl cellulose gelling agent, 0.5 to 5% of synthetic organic detergent selected from the group consisting of higher fatty acid monoglyceride monosulfates, higher alkyl sulfates, higher alkyl aryl sulfonates, higher olefin sulfonates, higher alkyl sulfoacetates, higher fatty esters of 1,2-dihydroxypropane sulfonates, substantially saturated higher aliphatic acyl amides of lower aliphatic aminocarboxylic acid compounds, higher alkyl poly-lower alkoxy sulfates, higher fatty acid soaps, block copolymers of ethylene oxide, propylene oxide and propylene glycol containing from 10 to 100 and more moles of lower alkylene oxide, alkylphenyl polyethoxy ethanols containing 10 to 100 and more moles of lower alkylene oxide, mixed copolymers of ethylene oxide and propylene oxide containing from 10 to 100 and more moles of lower alkylene oxide, polyethylene oxide derivatives of fatty alcohols, polyethylene oxide derivatives of fatty acids, and 0 to 30% of water which comprises making a polyhydric alcohol—sodium carboxymethyl cellulose mixture, admixing a polishing agent with such mixture, degassing the mixture to form a first intermediate product, preparing an essentially gas-free second intermediate mixture of the synthetic organic detergent in a polyhydric alcohol, and admixing the first and second mixtures under vacuum.

2. A method according to claim 1 wherein the polyhydric alcohol—gelling agent mix includes a liquid phase and the polishing agent is a finely divided inorganic material, degassing of the mixture is effected under vacuum, the synthetic organic detergent mixture includes an aqueous material selected from the group consisting of water and aqueous polyhydric alcohol, and degassing of the product is effected under vacuum.

3. A method according to claim 2 wherein the polyhydric alcohol is a mixture of glycerol and sorbitol, the polishing agent is dicalcium phosphate in opaque dentifrices and is selected from the group consisting of silica xerogel and complex aluminum silicate and mixture thereof in clear dentifrices, and the synthetic organic detergent is selected from the group consisting of sodium lauryl sulfate and sodium N-lauroyl sarcoside and mixtures thereof.

4. A method for the manufacture of a gas-free dentifrice containing from 10 to 85% of polyhydric alcohol, 0.5 to 10% of detergent, 0.1 to 5% of gelling agent and 5 to 75% of polishing agent which comprises making a gas-free mixture of a liquid medium selected from the group consisting of liquid polyhydric alcohol, water and mixtures of polyhydric alcohol and water, gelling agent and polishing agent, making an essentially gas-free mixture of a liquid medium selected from the group consisting of water, liquid polyhydric alcohol and mixtures of water and polyhydric alcohol, and detergent, and admixing the mixtures.

5. A method according to claim 4 wherein the essentially gas-free mixture of detergent is made by heating a gas-containing synthetic organic detergent solution at an elevated temperature for a sufficiently long period of time to drive off gases therein.

6. A method according to claim 4 wherein a volatile solvent is present in a composition selected from the group consisting of polyhydric alcohol-gelling agent-polishing agent and polyhydric alcohol-gelling agent-polishing agent-detergent compositions and said volatile solvent is heated and subjected to vacuum so as to be at least partially vaporized, to aid in the removal of unwanted gases present in such composition.

7. A method according to claim 4 wherein the mixture of liquid medium, gelling agent and polishing agent includes a polyhydric alcohol, the gelling agent is organic, the polishing agent is inorganic, degassing of the mixture is effected under vacuum, the detergent is a synthetic organic detergent selected from the group consisting of anionic and nonionic detergents and mixtures thereof, the synthetic organic detergent—liquid medium mixture includes a solvent selected from the group consisting of water and aqueous polyhydric alcohol, and degassing of the product is effected under vacuum.

8. A method according to claim 7 for producing a gas-free dentifrice containing from 15 to 75% of polyhydric alcohol, 0.5 to 5% of detergent, 0.1 to 3% of gelling agent, 10 to 60% of polishing agent and 8 to 30% of water, wherein the polyhydric alcohol is selected from the group consisting of glycerol and sorbitol and mixtures thereof, the organic gelling agent is selected from the group consisting of sodium carboxymethyl cellulose, hydroxypropyl methyl cellulose, methyl cellulose, Irish moss, polyvinyl alcohol, proteinaceous materials and vegetable gums, the polishing agent is selected from the group consisting of dicalcium phosphate, tricalcium phosphate, calcium carbonate, talc, calcium silicate, calcium aluminate, aluminum oxide, aluminum silicate, complex alkali metal or alkaline earth metal aluminosilicates, and silica xerogels, and the synthetic organic detergent is an anionic detergent selected from the group consisting of soluble metal salts of higher fatty alkyl sulfuric acids, higher fatty acylamido sarcosines, higher fatty alkyl sulfonic acids, higher fatty alkyl poly-lower alkoxy sulfuric acids, higher fatty acid diesters of glycerol monosulfuric acid and higher fatty acids.

9. A method according to claim 8 wherein the polyhydric alcohol is a mixture of glycerol and sorbitol, the organic gum is sodium carboxymethyl cellulose, the polishing agent is dicalcium phosphate in opaque dentifrices and is selected from the group consisting of silica xerogels and complex aluminosilicates in clear dentifrices, and the synthetic organic detergent is selected from the group consisting of sodium lauryl sulfate, sodium N-lauroyl sarcoside and mixtures thereof.

10. A method according to claim 9 wherein the dentifrice composition comprises from 10 to 35% of glycerol-sorbitol mixture with the ratio of glycerol:sorbitol being from 0.3:1 to 10:1, 20 to 75% of dicalcium phosphate, 0.1 to 3% of sodium carboxymethyl cellulose, 0.5 to 5% of synthetic organic detergent selected from the group consisting of sodium lauryl sulfate, sodium N-lauroyl sarcoside and mixtures thereof, and 5 to 30% of water, the synthetic organic detergent mixture comprises from 10 to 50% water, 10 to 40% synthetic detergent and 10 to 60% of polyhydric alcohol, gas is removed from the mixture by maintaining it at a temperature of 30 to 95° C. before addition to the polyhydric alcohol-gelling agent-polishing agent mixture, the admixings of the detergent mixture with the other mentioned constituents of the dentifrice composition are made stepwise, with up to ½ of the detergent mixture being first added, after which vacuum is applied and the balance of the detergent solution is subsequently added, followed by additional application of vacuum, and the vacuums applied in the various steps of the process are between about 500 and 760 millimeters of mercury.

11. A method according to claim 10 wherein an essentially gas-free solution of synthetic organic detergent is made by heating a gas-containing synthetic organic detergent mixture at an elevated temperature for a sufficiently long period of time to drive off gases therein.

12. A method according to claim 10 wherein flavoring material is admixed with the aforementioned constituents of the gas-free dentifrice subsequent to the addition of the synthetic organic detergent solution and vacuum degasification of the product, the product is kept under vacuum during such admixing, and the time of admixing is held to less than five minutes after addition of the flavoring materials, after which application of vacuum is discontinued, producing a gas-free dentifrice.

13. A method according to claim 12 wherein the polyhydric alcohol-gelling agent slurry contains from 0.1 to 0.5% of tetrasodium pyrophosphate, 0.1 to 1.0% of sodium benzoate, 0.05 to 0.3% of sodium saccharin and 20 to 40% of water, the dicalcium phosphate is a mixture of hydrated dicalcium phosphate and anhydrous dicalcium phosphate, the latter being present to the extent of about 5 to 20% of the dicalcium phosphate, the synthetic organic detergent mixture includes from 0.5 to 1.5% sodium lauryl sulfate, from 0.5 to 1.5% of sodium N-lauroyl sarcoside and from 3 to 8% of glycerine and the flavoring added includes from 0.5 to 2.5% of essential oil flavoring ingredients and from 1 to 5% chloroform to aid the quick penetration of the essential oils into the body of the dentifrice and to add flavor to the dentifrice.

14. A method according to claim 13 wherein the stepwise addition of detergent solution to the dentifrice ingredients is effected by adding up to ½ of the liquid detergent composition to the polyhydric alcohol-gelling agent-polishing agent mixture at about atmospheric pressure, applying vacuum to degas the mixture and adding the remainder of the detergent solution to such mixture at atmospheric pressure and applying degassing vacuum.

15. A method according to claim 14 wherein mixing of the dentifrice and application of deaerating vacuum are effected in a combination mixing and wall scraping apparatus which exposes new surfaces of the dentifrice for degassing, which surfaces are of a thickness less than 0.2 centimeter.

16. A method according to claim 10 wherein a volatile solvent is present in a composition selected from the group consisting of polyhydric alcohol-gelling agent-polishing agent- and polyhydric alcohol-gelling agent-polishing agent-detergent composition and said volatile solvent is heated and subjected to vacuum so as to be at least partially vaporized, to aid in the removal of unwanted gases present in such composition.

17. A method according to claim 9 wherein the dentifrice composition comprises from 40 to 85% of glycerol-sorbitol mixture with the ratio of glycerol:sorbitol being from 1:5 to 5:1, 5 to 40% of a polishing agent selected from the group consisting of sodium aluminosilicate, silica xerogel and mixtures thereof, 0.1 to 3% sodium carboxymethyl cellulose, 0.5 to 5% of a synthetic organic detergent selected from the group consisting of sodium lauryl sulfate, sodium N-lauroyl sarcoside and mixtures thereof and from 0 to 30% of water, the aqueous polyhydric alcohol mixture of synthetic organic detergent comprises 10 to 50% of water, 10 to 40% of synthetic organic detergent and 10 to 60% of polyhydric alcohol, gas is removed from the mixture while maintaining it at a temperature of 30 to 95° C. before admixing with the polyhydric alcohol-gelling agent-polishing agent mixture, the admixings of the detergent solution with the other mentioned constituents of the dentifrice composition are made stepwise, with up to ½ of the detergent solution being first added, after which vacuum is applied and the balance of the detergent solution is subsequently added, followed by additional application of vacuum, and the vacuums applied in the various steps of the process are between about 500 and 760 millimeters of mercury.

18. A method according to claim 17 wherein a volatile solvent is present in a composition selected from the group consisting of polyhydric alcohol-gelling agent-polishing agent and polyhydric alcohol-gelling agent-polishing agent-detergent compositions and said volatile solvent is heated and subjected to vacuum so as to be at least partially vaporized, to aid in the removal of unwanted gases present in such composition.

19. A method according to claim 17 wherein an essentially gas-free solution of synthetic organic detergent is made by heating a gas-containing synthetic organic detergent mixture at an elevated temperature for a sufficiently long period of time to drive off gases therein.

20. A method according to claim 17 wherein the aqueous polyhydric alcohol-gelling agent-polishing agent mixture contains from 0.05 to 0.3% of sodium saccharin and 0.05 to 1% of preservative for the organic constituents of the dentifrice, the polishing agent is a complex sodium aluminosilicate having an index of refraction like that of the balance of the dentifrice composition, so as to give the dentifrice the appearance of a clear gel, the synthetic organic detergent-polyhydric alcohol-water mixture includes from 0.5 to 3% of a synthetic organic detergent selected from the group consisting of sodium lauryl sulfate, sodium N-lauroyl sarcoside and mixtures thereof, and from 50 to 75% of a mixture of sorbitol and glycerine with the sorbitol:glycerine ratio being from 1:1 to 3:1, and flavoring is added after mixing of the other materials and includes from 0.5 to 2.5% of essential oil flavoring ingredients and from 1 to 5% of chloroform to aid the quick penetration of the essential oils into the body of the dentifrice and to add flavor to the dentifrice.

21. A method according to claim 20 wherein the stepwise addition of detergent solution to the other dentifrice ingredients is effected by adding up to ½ of the liquid detergent composition to the polyhydric alcohol-gelling agent-polishing agent mixture at about atmospheric pressure, applying vacuum to degas the mixture, adding the remainder of the detergent solution to such mixture at atmospheric pressure and applying degassing vacuum to produce a gas-free product, after which there are added to such product the essential oil flavoring ingredients and chloroform to aid the quick penetration of the essential oils into the body of the dentifrice and to add flavor to the dentifrice.

22. A method according to claim 21 wherein mixing of the dentifrice and application of deaerating vacuum are effected in a combination mixing and wall scraping apparatus which exposes new surfaces of the dentifrice for degassing, said surfaces being of a thickness less than 0.2 centimeter.

References Cited
UNITED STATES PATENTS

| | | | |
|---|---|---|---|
| 3,506,757 | 4/1970 | Salzmann | 424—52 |
| 3,551,559 | 12/1970 | Miles | 424—49 |
| 3,711,604 | 1/1973 | Colodney et al. | 424—52 |

RICHARD L. HUFF, Primary Examiner

U.S. Cl. X.R.

424—54, 56, 57